(12) United States Patent
Erignac

(10) Patent No.: US 7,856,314 B2
(45) Date of Patent: Dec. 21, 2010

(54) EXHAUSTIVE SWARMING SEARCH STRATEGY USING DISTRIBUTED PHEROMONE MAPS

(75) Inventor: Charles A. Erignac, Seattle, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 12/554,788

(22) Filed: Sep. 4, 2009

(65) Prior Publication Data

US 2010/0114489 A1     May 6, 2010

Related U.S. Application Data

(62) Division of application No. 11/440,626, filed on May 24, 2006, now Pat. No. 7,606,659.

(60) Provisional application No. 60/686,362, filed on Jun. 1, 2005.

(51) Int. Cl.
*G08G 1/123* (2006.01)
*G01C 21/00* (2006.01)

(52) U.S. Cl. .................. 701/208; 701/23; 701/211; 342/357.1; 340/995.17

(58) Field of Classification Search ............. 701/208, 701/23, 25, 201, 205, 209, 210, 211; 340/995.17, 340/995.28; 342/357.1
See application file for complete search history.

(56) References Cited

U.S. PATENT DOCUMENTS

| | | | | |
|---|---|---|---|---|
| 6,012,013 | A * | 1/2000 | McBurney | 701/207 |
| 6,212,471 | B1 | 4/2001 | Stiles et al. | |
| 2005/0171691 | A1* | 8/2005 | Smartt et al. | 701/208 |
| 2007/0088499 | A1 | 4/2007 | Erignac | |

FOREIGN PATENT DOCUMENTS

| WO | WO-03071465 | 8/2003 |
|---|---|---|
| WO | WO-2005076967 A2 | 8/2005 |

OTHER PUBLICATIONS

Clark, C.M. et al., "Dynamic Networks for Motion Planning in Multi-Robot Space Systems", 8 pgs, Department of Aeronautics & Astronautics, Stanford University.

Cox, R et al., "Optimistic Replication Using Vector Time Pairs", 16 pgs.

(Continued)

*Primary Examiner*—Tan Q Nguyen
(74) *Attorney, Agent, or Firm*—Perkins Coie LLP

(57) ABSTRACT

Method and systems for using agents to perform an operation (e.g., a search) over a geographic area are provided. The system can first create a digital map of the geographic region divided into cells that contain information about the progress of an operation related to the geographic region. Next, the system can calculate a distance gradient of the digital map. The distance gradient indicates the distance from cells of the digital map to the nearest unoperated cell. The system can determine the next move for each agent based on the distance gradient. Also described are methods and systems for efficiently exchanging digital map information among agents and for distributing agents to increase network coverage and decrease agent crowding.

10 Claims, 8 Drawing Sheets

OTHER PUBLICATIONS

Erignac, Charles A., "An Exhaustive Swarming Search Strategy based on Distributed Pheromone Maps—Technical Report", 20 pgs, The Boeing Company.

Fredslund, Jakob et al., "A General Algorithm for Robot Formations Using Local Sensing and Minimal Communication", pp. 837-846, IEEE Transactions on Robotics and Automation, vol. 18, No. 5, Oct. 2002.

Gaudiano P. et al., "Evolving behaviors for a swarm of unmanned air vehicles," 2005 IEEE Swam Intelligence Symposium (IEE CAT No. 05EX1002), New Jersey, USA, 2005, pp. 317-324.

Gaudiano, Paolo et al., "Swam Intelligence: a New C2 Paradigm with an Application to Control of Swarms of UAV's", 12 pgs, 8th ICCRTS Command and Control Research and Technology Symposium, Jun. 2003.

International Search Report and Written Opinion for PCT/US06/20804; Applicant: The Boeing Company; May 11, 2007, European Patent Office, 16 pgs.

Klavins, Eric, "Communication Complexity of Multi-Robot Systems", 17 pgs, California Institute of Technology, Pasadena, CA.

Payton, D. et al., "Pheromone Robotics", Autonomous Robots 11, 319-324, 2001, Kluwer Academic Publishers, The Netherlands.

Reynolds, Craig W., "Flocks, Herds, and Schools: A Distributed Behavioral Model", 13 pgs, 1987, Association for Computing Machinery.

Reynolds, Craig W., "Steering Behaviors for Autonomous Characters", 25 pgs, Cony Computer Entertainment America, Foster City, CA.

Sauter, John et al., "Evolving Adaptive Pheronmone Path Planning Mechanisms", pp. 434-440, Jul. 2002, AAMAS, Bologna, Italy.

Swarm Intelligence: From Natural to Artifical Systems(Santa Fe Institute Studies on the Sciences of Complexity); 10 pgs; [accessed May 24, 2006]; http://www.amason.com/gp/product/0195131592.

Van Dyke Parunak, H., "Swarming Coordination of Multiple UAV's for Collaborative Sensing", 9 pgs, Sep. 2003, 2nd AIAA "Unmanned Unlimited" Systems, Technologies and Operations, American Institue of Aernautics and Astronautics.

Winfield, Alan, "Distributed Sensing and Data Collection Via Broken Ad Hob Wireless Connected Networks of Mobile Robots", 10 pgs, Intelligent Autonomous Systems laboratory, University of the West of England, Bristol.

\* cited by examiner

FIG. 8A

|   | A | B | C | D | E | F | G | H | I | J |
|---|---|---|---|---|---|---|---|---|---|---|
| 1 |   |   |   |   |   | S | S | S | S | S |
| 2 |   |   |   |   |   | S |   |   |   | A |
| 3 | A |   |   |   |   | S |   |   |   |   |
| 4 | S | S | S |   |   | S | S | S | S | S |
| 5 | S | S | S |   |   |   |   |   |   |   |
| 6 | S | S | S |   |   |   |   |   |   |   |

FIG. 8B

|   | 0 | 0 | 0 | 0 | 0 | 1 | 1 | 1 | 1 | 1 |
|---|---|---|---|---|---|---|---|---|---|---|
| 1 | 0 | 0 | 0 | 0 | 0 | 1 | 1 | 1 | 1 | 1 |
| 2 | 0 | 0 | 0 | 0 | 0 | 1 | 0 | 0 | 0 | 0 |
| 3 | 0 | 0 | 0 | 0 | 0 | 1 | 0 | 0 | 0 | 0 |
| 4 | 1 | 1 | 1 | 0 | 0 | 1 | 1 | 1 | 1 | 1 |
| 5 | 2 | 2 | 1 | 0 | 0 | 0 | 0 | 0 | 0 | 0 |
| 6 | 3 | 2 | 1 | 0 | 0 | 0 | 0 | 0 | 0 | 0 |

EXHAUSTIVE SWARMING SEARCH STRATEGY USING DISTRIBUTED PHEROMONE MAPS

CROSS-REFERENCE TO RELATED APPLICATIONS

The present application is a divisional application of U.S. patent application Ser. No. 11/440,626, filed May 24, 2006, entitled EXHAUSTIVE SWARMING SEARCH STRATEGY USING DISTRIBUTED PHEROMONE MAPS, which claims priority to U.S. Provisional Application No. 60/686,362 filed on Jun. 1, 2005 and entitled "EXHAUSTIVE SWARMING SEARCH STRATEGY USING DISTRIBUTED PHEROMONE MAPS," which is hereby incorporated by reference.

BACKGROUND

Unmanned aerial vehicles (UAVs) are being used in a variety of situations where the risk to the pilot of a manned vehicle is high, such as in military operations. UAVs often operate in swarms in which a large number of agents perform a simple set of tasks to accomplish a larger goal. Swarms are well suited to perform missions having a search stage where multiple entities must be located over a wide geographic area. The simplified tasks performed by each agent in the swarm allow a greater number of agents to be controlled and monitored by fewer human operators. Pheromone maps are a common coordination mechanism between agents that emulate insect foraging behavior. Insects mark their environment with pheromones to leave messages for other insects. A digital pheromone map overlays a digital grid onto a geographic area. Similar to insects, agents leave digital information for other agents in each cell of the digital grid. The digital pheromone map acts as an action selection input for the next movement for each agent.

Digital pheromone map systems rely on each agent having a relatively accurate copy of the map and may utilize either a central map that all agents connect to or a distributed map maintained by each agent. Centralized map systems are susceptible to network outages, such as those caused by the agent moving out of range or active jamming of the map signal. However, distributed map systems require a sophisticated synchronization strategy to ensure that each agent has an up-to-date map to conduct an effective search.

Existing swarming search strategies conduct searches based on moving agents using a pheromone gradient from areas of high pheromone concentration (i.e., a high number of searched cells) to areas of lower pheromone concentration (i.e., a low number of searched cells). Such an approach is subject to local minima in which an agent is in an area of low pheromone concentration surrounded by areas of high pheromone concentration. This causes the agent to unnecessarily search the local minima while ignoring faraway unsearched areas. Typical swarm search strategies also do not optimize the search coverage of each agent while maximizing the coverage of the network created by the distributed agents. A poorly distributed network of agents makes the search system more susceptible to agent attrition, such as when an agent malfunctions or is destroyed by an enemy. Finally, updates between distributed agents are often inefficient because they require unnecessary synchronization between agents that do not have relevant digital pheromone map differences.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Aspects of the invention are directed to methods and systems for performing an operation (e.g., an exhaustive search) related to a geographic area using one or more agents. In particular aspects, the system first creates a digital map (e.g., a pheromone map) of the geographic region divided into cells that contain information about the progress of the operation over the geographic region. For example, a cell may contain an indication of whether a particular section of the geographic area has been searched by an agent. Next, the system calculates a distance gradient of the digital map indicating the distance from each cell to the next unoperated cell (e.g., an unsearched cell). The system determines the next move for each agent based on the distance gradient. For example, a search system may move an agent toward areas of the map that have not yet been searched by following decreasing gradient values.

In some aspects, each agent maintains an instance of the digital map and communicates with other agents to synchronize instances of the map. An agent (i.e., the sending agent) may send a key to other agents that contains a summary of the state of the sending agent's instance of the map that other agents can use to determine if they need to synchronize with the sending agent. If so, the other agents can request a more detailed update from the sending agent. The agents synchronize the received update information with their individual instances of the digital map.

In further aspects each agent's path is chosen to increase the communication range of a network between the agents and to reduce crowding among agents. Each agent may operate as a node in a wireless network and the farther apart agents are while staying within range of at least one other agent, the broader the coverage of the network will be. Likewise, the less crowded agents are the less likely an agent will cover an area that another agent has already covered or collide with other agents.

BRIEF DESCRIPTION OF THE DRAWINGS

FIGS. 8A-8B illustrate a distance-based gradient of the digital pheromone map in one embodiment.

DETAILED DESCRIPTION

Figure 1:
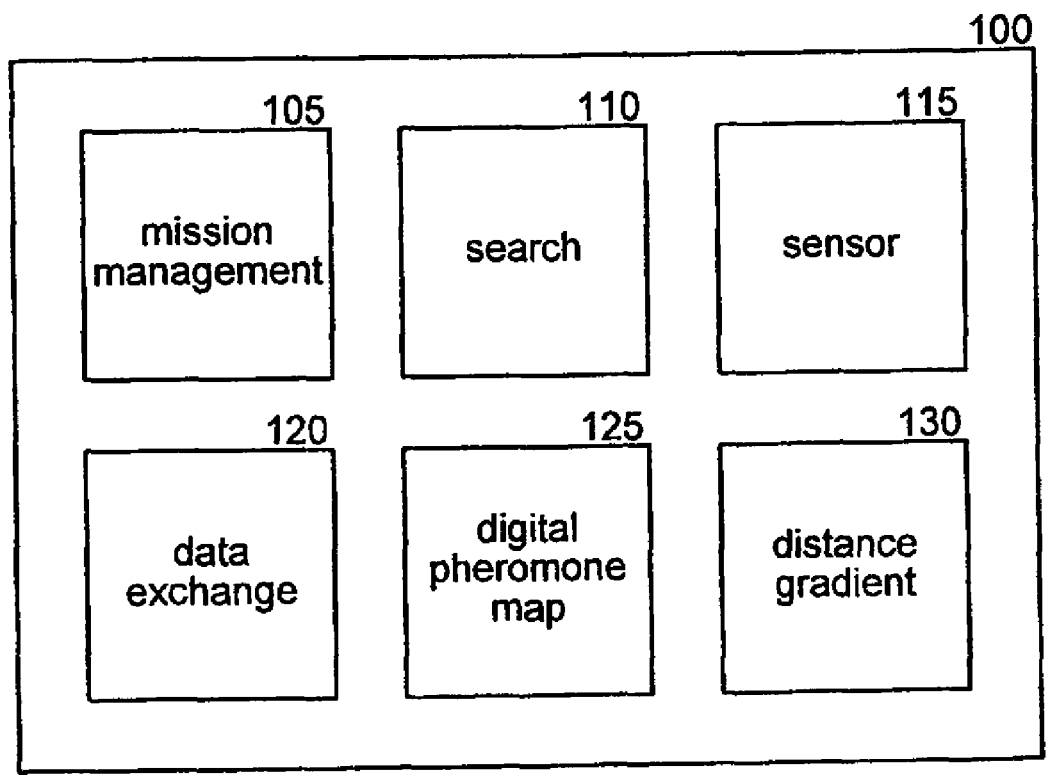
FIG. 1 is a block diagram that illustrates components of the search system in one embodiment.

Methods and systems for performing operations related to a geographic area (e.g., search operations) are provided. Certain aspects and examples of the methods and systems are described generally below, and additional examples are further described in the context of the included figures. Many of these aspects are described in the context of search systems that conduct a search over a geographic area, but extend to more general systems that perform other operations as well.

In a particular embodiment, the system first creates a digital pheromone map of the geographic region divided into cells that contain information about the progress of a search or other operation related to the geographic region. For example, a cell may contain an indication of whether a particular section of the geographic area has been searched by an agent. Next, the system calculates a distance gradient of the digital pheromone map. The distance gradient indicates the distance from each cell of the digital pheromone map to the nearest unsearched cells (or unoperated cells in the case of an operation other than a search), such as by calculating the Euclidian distance between the cells. For example, a gradient value of zero for a cell may indicate that the section of the geographic area represented by the cell has not yet been searched, while a gradient value of two may indicate that the nearest unsearched cell is two cells away. At any point in time an agent can move in one of eight directions within the digital pheromone map (e.g., left, right, forward, backward, or diagonally one cell). The system determines the next move for each search agent based on the distance gradient. For example, a search system may move an agent toward areas of the map that have not yet been searched by following decreasing gradient values.

In some embodiments, the search system produces an exhaustive search of the geographic area. Each agent can perform a simple, reactive behavior based on the map gradient, and the combined result of multiple agents can produce an exhaustive, coordinated search. In general, each agent is either marking an area, on its way to an unmarked area, or spreading out network coverage around other marking agents. The distance gradient need not be subject to local minima like prior swarming search strategies because as areas of the map are searched, an absolute minima forms around unsearched areas. Therefore, following the distance gradient leads to the next closest unsearched area. This method leads to exhaustive coverage of the search area in a finite search time.

In other embodiments, search agents follow four basic behaviors: contour following, avoidance, gradient descent, and random movement. Contour following is selected when an agent is located at a boundary cell (e.g., a searched cell located next to at least one unsearched cell) when another agent is not nearby. The agent can move perpendicular to the distance gradient in a "lawnmower" pattern either spiraling from an outer boundary toward the center or from the center of an area toward the outer boundary. Avoidance behavior is selected when another search agent is within a predefined range. Avoidance behavior can distribute agents in the swarm, thus increasing coverage of the network and reducing crowding of agents. In a particular embodiment, each pair of adjacent agents can select a course perpendicular to their mutual collision course. This avoidance behavior divides pools of connected unsearched cells that are bounded by searched cells. In some embodiments, if there is more than one agent within the avoidance range, the search system avoids only the closest one. Gradient descent is selected when an agent is located at a searched cell that is not a boundary cell. Gradient descent facilitates moving the agent to the next nearest unsearched cell by drawing agents toward pools of unsearched cells. Finally, random movement is selected when none of the other behaviors produce a move for an agent. For example, when an agent is repelled by avoiding another agent against the boundary of the digital pheromone map, a random move may be selected.

In some aspects, contour following is guided by defining four-connected pools. A four-connected pool is a set of cells whose distance to the next unsearched cell is one cell. Although an agent can move diagonally, such a move could cause the agent to move diagonally from one unsearched cell inside a pool to another unsearched cell outside the pool in areas where the pool contains a diagonal boundary. By defining a pool based on four-connected cells and guiding the contour following behavior using these pools, the search system can prevent agents from leaving a pool with unsearched cells by an otherwise valid move. Staying within the pool prevents agent crowding and facilitates the completion of the search.

In some cases, the search system defines a minimum distance between agents when using gradient descent and adjusts the distance based on current conditions. This distance creates a repulsive force between agents that minimizes crowding and avoids collisions. However, sometimes the repulsive force prevents agents using gradient descent to get to the same pool of unsearched cells from entering the pool. Therefore, in some embodiments, if a pool is not getting smaller, the search system reduces the repulsive force by reducing the minimum distance between the agents until one of the agents is able to enter the pool and search the cells.

In some instances, the search system selects a size for cells of the digital pheromone map based on the footprint of a sensor carried by or otherwise associated with the search agent. For example, the search agent may be fitted with an infrared sensor that is able to detect heat in the environment within a 100-foot by 100-foot area. The search system may select a cell size equal to the sensor footprint or slightly smaller than the sensor footprint to allow for some overlap as agents pass over the section of the geographic area represented by each cell.

Aspects of the search system may mark searched cells of the digital pheromone map with an identifier of the search agent that searched the cell and the time that the cell was searched. This information can be used to detect areas that are stale and need to be searched again (e.g., for time-dependent searches), or can be used to detect areas that may need to be searched again when a particular agent is determined to be unreliable (e.g., such as when a faulty sensor is detected).

In some embodiments, the search agents form an ad hoc network. Each agent has an independent copy of the digital pheromone map and executes its own search strategy. When in range, search agents synchronize their copies of the digital pheromone map to determine areas searched by other agents. For example, two agents may start out at opposite sides of an island to be searched, and may be out of communication range with each other. As the agents independently search the island, they will eventually come into communication range and exchange data about the cells that each agent has searched. The agents then determine the next cell to search based on the remaining cells not searched by either agent. As agents come into communication range and synchronize map information, they spread the coverage of the ad hoc network formed by all the agents by propagating updates outward. The propagation of updates eventually connects separate subsets of the swarm.

In some cases, search agents exchange summaries of their copies of the digital pheromone map before performing a full synchronization with each agent. For example, the search system may assign a serial number to each agent that is incremented each time the agent makes an update to the digital pheromone map. Each agent can then exchange a list of agents and serial numbers that indicate what information that agent has received from each of the other agents. For example, if agents A and B exchange information that indicates that both have the same serial number from agent C, then it is not necessary for A and B to exchange information received from C because each is equally up to date with respect to C. The list of agents and serial numbers forms a key that summarizes the state of the instance of the digital pheromone map held by a particular agent. This method allows each agent to optimize the agents that it synchronizes with and to reduce the information requested from other agents during synchronization. In other embodiments, other pluggable, incremental algorithms for updates may also be used.

In some embodiments, the search system optimizes the agents that each agent synchronizes with. For example, an agent may choose to only synchronize with nearby agents, such as by applying a Delaunay filter, because nearby agents are most likely to have relevant information to the requesting agent's next move when there are still unsearched cells in close proximity. A Delaunay filter is a triangulation technique that removes neighboring agents that are not nearest neighbors from the list of agents to synchronize with. This allows each agent to synchronize with the smallest number of agents and results in a network topology between the agents that is an approximate minimal spanning tree. As another example, an agent may sort the summaries received from agents by the number of differences with the agent's own copy of the digital pheromone map. The agent can then choose to synchronize first with those agents having the most differences. This method may eliminate the need to synchronize with many of the other agents that have information that is redundant with the information received from the first agent.

In some aspects, the search system does not update the distance gradient of the entire digital pheromone map following a received update. Common optimization techniques may be used by a particular agent to reduce the area of the map that needs to be updated. For example, a wavefront propagation method based on Dijsktra's algorithm can be used to compute updated distances to unsearched nearby cells following an update while ignoring faraway cells.

In some cases, the search system instructs agents to operate in a post-search mode. Searching may only be the first phase in a sequence. For example, once a target is found, agents may switch to a target-destroying mode. In post-search modes the agents may no longer use the digital pheromone map, but may instead switch to control by a human operator or other control schemes applicable to the new mode.

FIG. 1 is a block diagram that illustrates components of the search system in one embodiment. The search system 100 contains a mission management component 105, a search component 110, a sensor component 115, a data exchange component 120, a digital pheromone map component 125, and a distance gradient component 130. The mission management component 105 can guide the overall progress of the system through a variety of stages, such as a search stage and a target-destroying stage. The search component 110 can perform searches of a geographic area and determine the search path followed by a search agent. In embodiments that do not perform searches, the search component may be replaced by an operation component that guides the particular operation to be performed. For example, an advertising component could guide the flight of a UAV over an area to distribute leaflets. The sensor component 115 can sense details of the environment that are relevant to the search. For example, the sensor component 115 may manage an infrared or radar sensor or sensor array. The digital pheromone map component 125 can create and maintain an instance of a digital pheromone map that stores digital information in cells that correspond to sections of the geographic region being searched. The data exchange component 120 can exchange data about the digital pheromone map and search progress with other search agents. The distance gradient component 130 can compute a distance field and gradient over the digital pheromone map that indicates the distance from each cell to the nearest unsearched cell. The components of the search system 100 may be embodied in a single search agent, centrally located, or divided among the agents and a central location.

The computing device on which the system is implemented may include a central processing unit, memory, input devices (e.g., keyboard and pointing devices), output devices (e.g., display devices), and storage devices (e.g., disk drives). The memory and storage devices are computer-readable media that may contain instructions that implement the system. In addition, the data structures and message structures may be stored or transmitted via a data transmission medium, such as a signal on a communication link. Various communication links may be used, such as the Internet, a local area network, a wide area network, a point-to-point dial-up connection, a cell phone network, an ad hoc network, and so on. The computing device may be connected to various peripheral devices such as avionics, sensors, weapons, and so on.

Embodiments of the system may be implemented in various operating environments that include personal computers, server computers, hand-held or laptop devices, multiprocessor systems, microprocessor-based systems, embedded processor-based systems, programmable consumer electronics, digital cameras, network PCs, minicomputers, mainframe computers, distributed computing environments that include any of the above systems or devices, and so on. The computer systems may be cell phones, personal digital assistants, smart phones, personal computers, programmable consumer electronics, digital cameras, unmanned aerial vehicles, and so on.

The system may be described in the general context of computer-executable instructions, such as program modules, executed by one or more computers or other devices. Generally, program modules include routines, programs, objects, components, data structures, and so on that perform particular tasks or implement particular abstract data types. Typically, the functionality of the program modules may be combined or distributed as desired in various embodiments.

Figure 2:
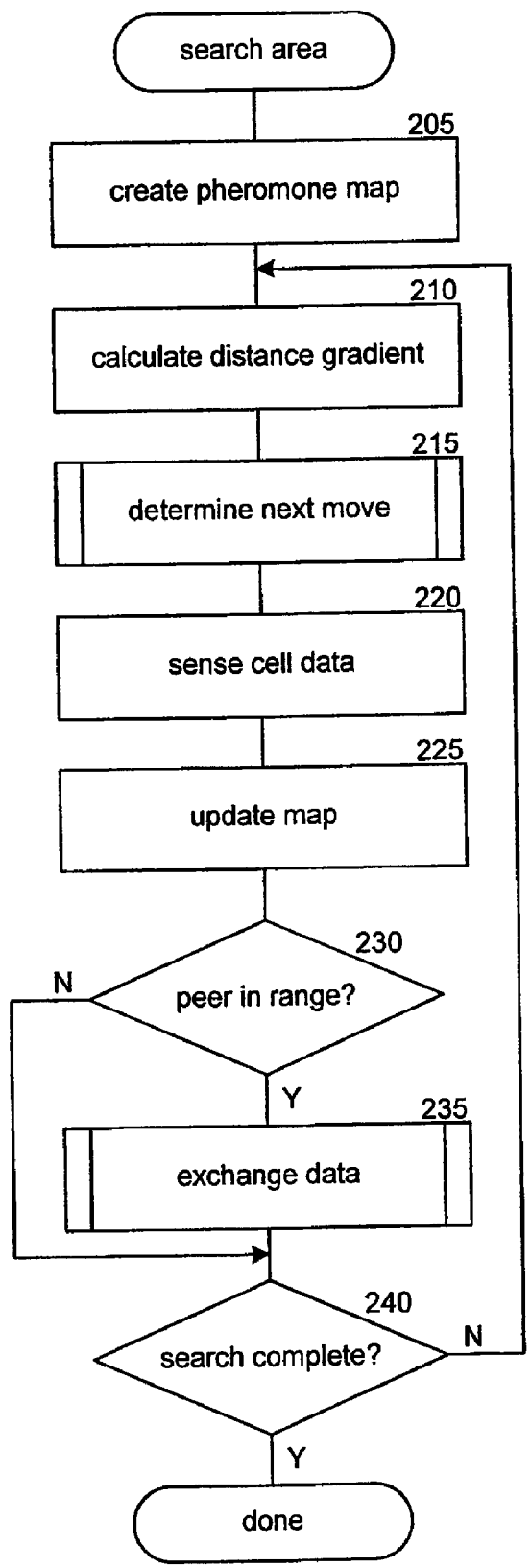
FIG. 2 is a flow diagram that illustrates the processing of the search (or other operation) component of the system in one embodiment.

FIG. 2 is a flow diagram that illustrates the processing of the search (or other operation) component of the system in one embodiment. The component is invoked to perform the operational objective of the system, such as to search a geographic region for target objects. In block 205, the component creates a digital pheromone map with cells that store information corresponding to the progress of the search of each section of the geographic region. In block 210, the component calculates a distance field and gradient over the digital pheromone map that indicates the distance from each cell to the nearest unsearched cell. Algorithms for calculating a distance field and gradient are well known to those of ordinary skill in the art. In block 215, the component determines the next move to be made by a particular search agent. Further details of the manner by which the next move may be calculated are described below with reference to FIG. 5. In block 220, the component instructs the agent to use a sensor to sense environmental information for the section of the geographic region represented by the cell of the digital pheromone map where the agent is currently located. For example, the sensor may be an infrared sensor and the component may instruct the agent to store information in the digital map about the location of areas of high heat in the agent's path. In block 225, the component updates the digital pheromone map based on the information gathered by the sensor. In decision block 230, if a peer is in range, then the component continues at block 235 and invokes the data exchange component to determine if map data should be synchronized with the other agent, else the component continues at block 240. In decision block 240, if the component determines that the search is complete, then the component finishes, else the component loops to block 210 to recalculate the distance gradient and search additional sections of the geographic region.

Figure 3:
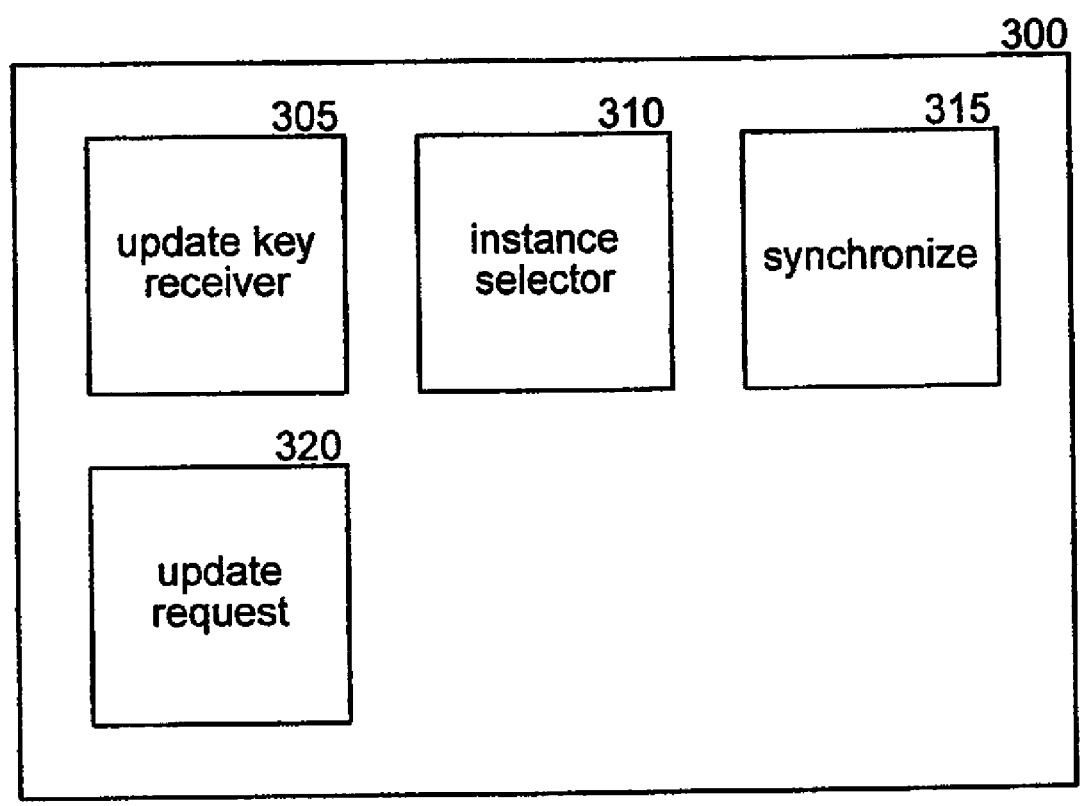
FIG. 3 is a block diagram that illustrates subcomponents of a data exchange component of the system in one embodiment.

FIG. 3 is a block diagram that illustrates subcomponents of the data exchange component of the system in one embodiment. The data exchange component 300 contains an update key receiving component 305, an instance selector component 310, a synchronize component 315, and an update request component 320. The update key receiving component 305 receives summaries of the state of instances of the digital pheromone map maintained by other agents. For example, each agent may maintain a separate instance of a distributed digital map that is synchronized when the agents come within range of one another. The update key may summarize the state of a particular agent's instance of the map. The instance selector component 310 uses the received summaries to determine which other agents have updated information. The update request component 320 requests map updates from those search agents selected by the instance selector component 310. The synchronize component 315 synchronizes the received updates with the local instance of the digital pheromone map.

Figure 4:
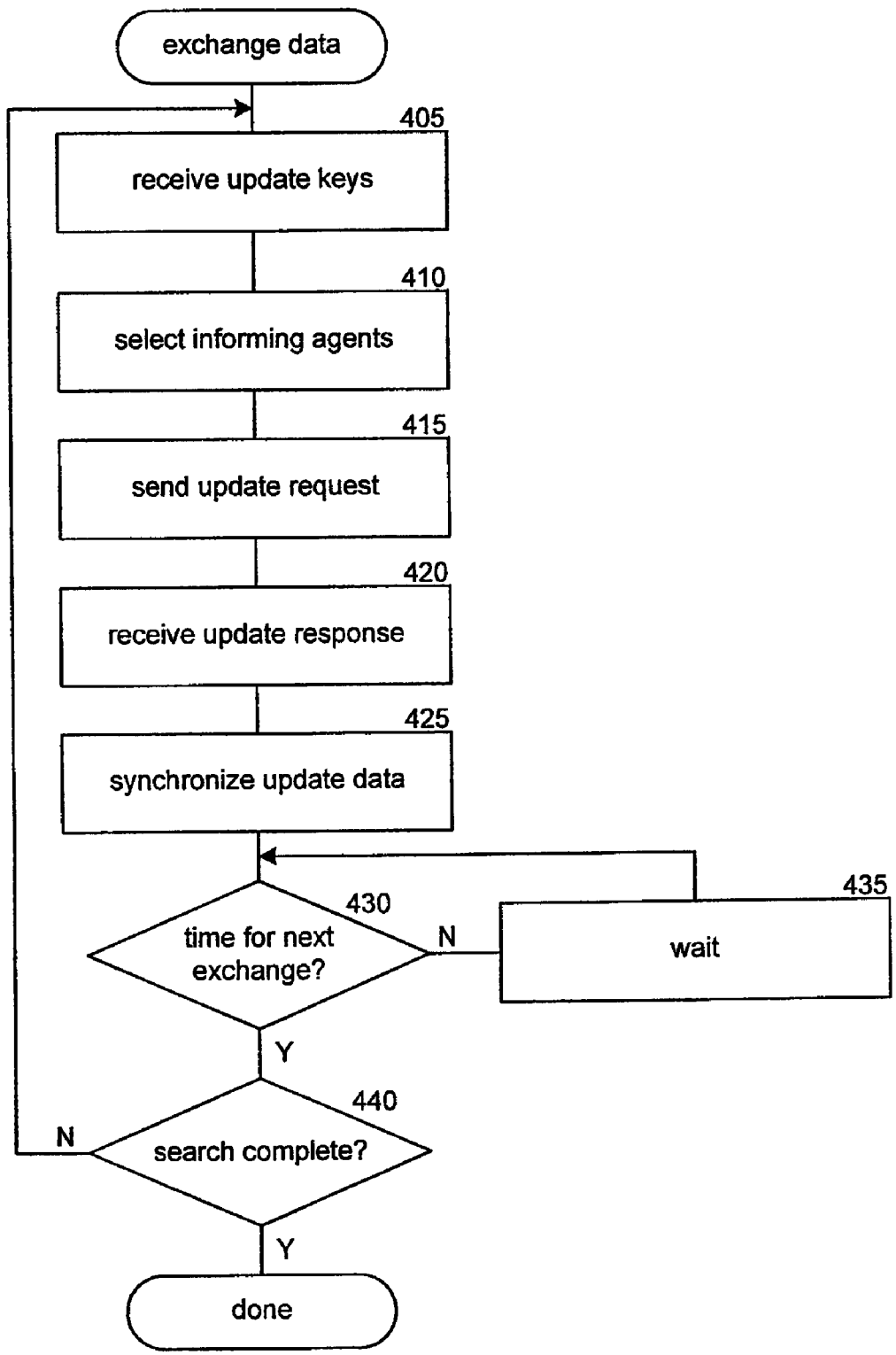
FIG. 4 is a flow diagram that illustrates the processing of the data exchange component of the system in one embodiment.

FIG. 4 is a flow diagram that illustrates the processing of a data exchange component of the system (outlined in FIG. 3) in accordance with one embodiment. The component may be invoked when two agents are within communication range to determine if they should exchange data about the progress of the search. In block 405, the component receives update keys from nearby agents on behalf of a requesting agent containing a summary of the state of the search information maintained by each agent. For example, the keys may contain a list of agents that the agent has received data from, or quadrants of the map that the agent has recent information about. In block 410, the component selects agents to synchronize with based on whether the summaries received indicate that those agents have new information. For example, if a key indicates that an agent has only synchronized with agents that the requesting agent has already synchronized with, then the two agents may not gain any new information by synchronizing with each other. In block 415, the component sends update requests to the selected agents. In block 420, the component receives updates from the selected agents. In block 425, the component synchronizes the received search information with the local search information. In decision block 430, if it is not yet time for the next data exchange, then the component continues at block 435, else the component continues at block 440. In block 435, the component waits for an amount of time or for an event to occur and then loops to block 430 to determine if it is time for the next data exchange. In decision block 440, if the search is complete, then the component finishes, else the component loops to block 405 to perform the next data exchange.

Figure 5:
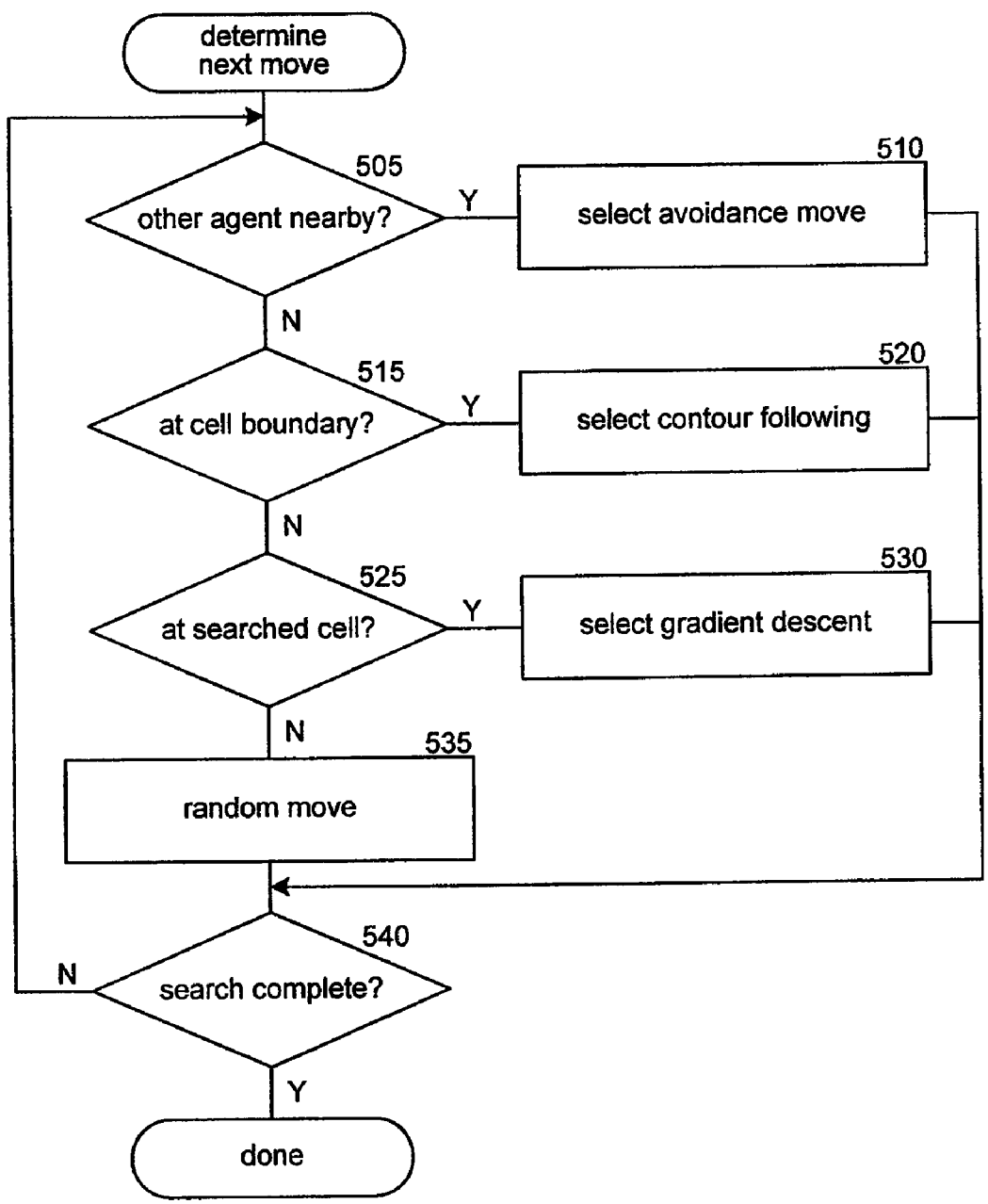
FIG. 5 is a flow diagram that illustrates the processing of the search component of the system in one embodiment.

FIG. 5 is a flow diagram that illustrates the processing of the search component of the system in one embodiment. The component is invoked by an agent to determine the next move the agent should make. In decision block 505, if another agent is nearby, then the component continues at block 510, else the component continues at block 515. Another agent may be determined to be nearby based on a number of factors such as the sensor footprint, communication range, flight speed, or other details about each agent. In block 510, the component determines the next move based on avoiding the nearby agent and then continues at block 540. For example, the agent may decide to follow a heading perpendicular to the current heading to prevent colliding with the other agent. In decision block 515, if the agent is at an unsearched cell next to a cell boundary, then the component continues at block 520, else the component continues at block 525. In block 520, the component determines the next move based on contour following of the cell boundary and then continues at block 540. For example, the agent may follow a spiral path along the inside of a boundary of searched cells to fill in a pool of unsearched cells. In decision block 525, if the agent is located at a searched cell, then the component continues at block 530, else the component continues at block 535. In block 530, the component determines the next move based on gradient descent, which leads the agent in the direction of an unsearched cell, and then continues at block 540. For example, if the agent has just finished filling in a pool of unsearched cells, leaving the agent surrounded by only searched cells, then gradient descent leads the agent to the next pool of unsearched cells. In block 535, the component selects a random move after failing to find any other valid move. For example, the agent may follow a circular pattern to stay in place until a better move can be determined, or the agent may return to a home base if a sensor or other defect is suspected. In decision block 540, if the search is complete, then the component finishes, else the component loops to block 505 to determine the next move.

Figure 6:
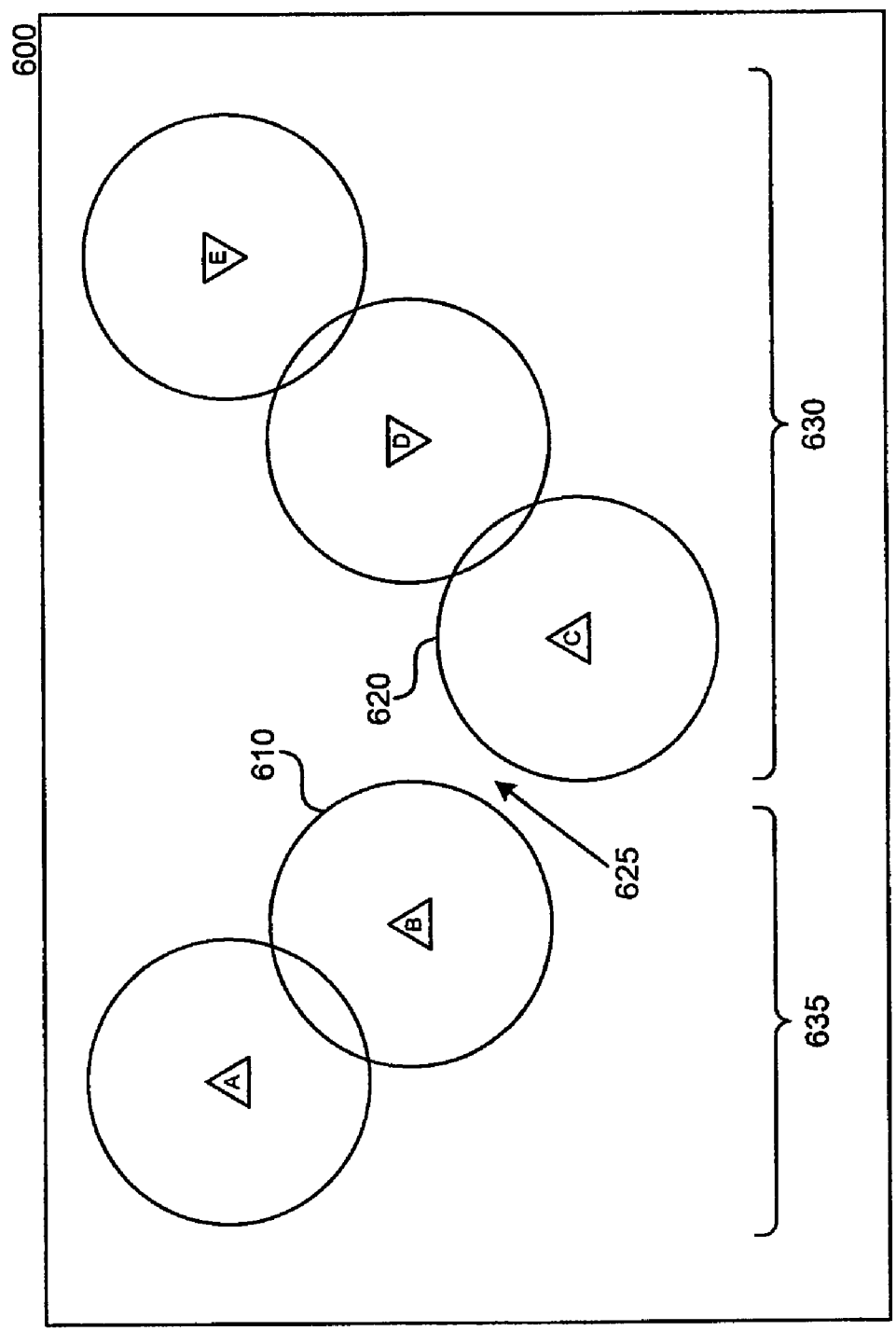
FIG. 6 illustrates an ad hoc network formed by search agents of the system in one embodiment.

FIG. 6 illustrates an ad hoc network formed by search agents of the system in one embodiment. The geographic region 600 contains many agents, for example, agent A, agent B, agent C, agent D, and agent E. The circles around each agent (two of which are identified in FIG. 6 as circles 610 and 620) illustrate the communication range of the network components of each agent. Although shown as circles, the communication range of each agent may not always be circular because of factors such as the topography of the geographic region (e.g., mountains) that may block communication in one or more directions. The agents form an ad hoc network by their movement around the geographic region. For example, in the illustration, agent A and agent B are in communication range and can synchronize map data. Likewise agent D is in communication range with agent E, and agent C is in communication range with agent D. Therefore, agent C and agent E may have synchronized map data even though they are not within communication range of each other by a network subnet 630 formed by their common communication with agent D. As agents spread out within the geographic region, disconnected subnets (such as those identified as 630 and 635 in FIG. 6) of agents may synchronize with each other to expand the network topology. For example, location 625 illustrates agent C nearing communication range with agent B, which will connect subnets 630 and 635.

Figure 7A:
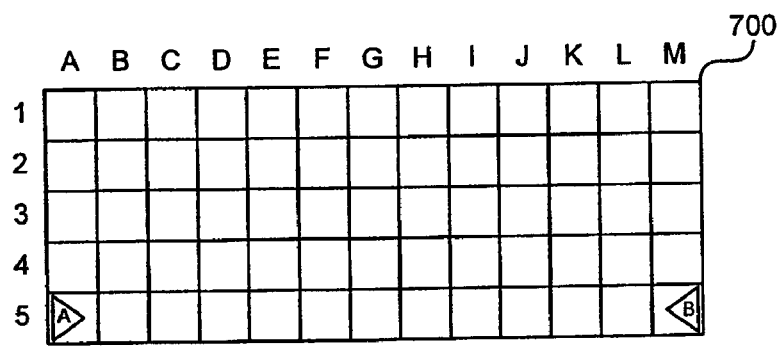
FIGS. 7A-7C illustrate the formation of pools of unsearched cells within the digital pheromone map in one embodiment.
Figure 7B:
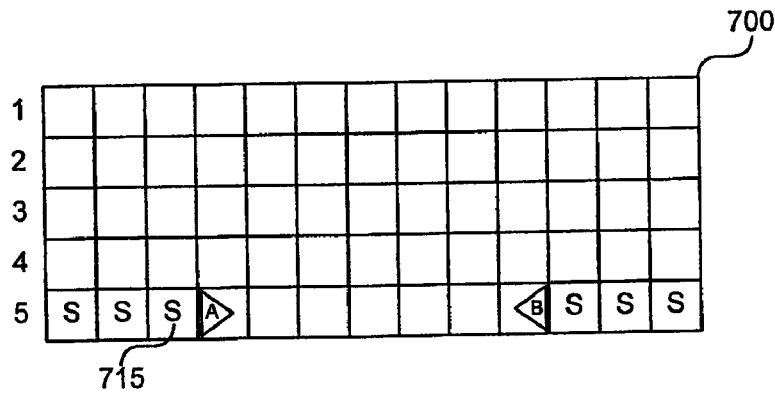
Figure 7C:
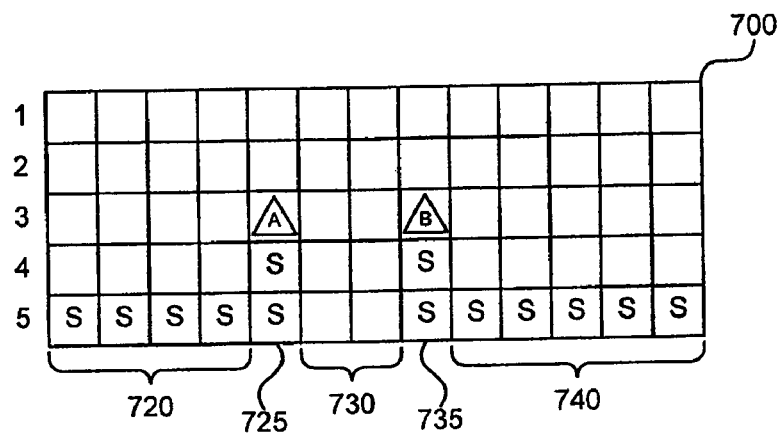

FIGS. 7A-7C illustrate the formation of pools of unsearched cells within the digital pheromone map in one embodiment. In FIG. 7A, two agents, agent A and agent B start out at opposite corners of a map 700 and head straight toward each other. In FIG. 7B, agent A and agent B have moved closer together creating searched cells 715 behind them marked with an "S" for illustration. As the agents move closer, they will eventually be within avoidance range of each other. FIG. 7C illustrates how the agents avoided each other (when they reached columns E and H, respectively) by turning and choosing a parallel heading. The avoidance behavior of the agents divides the map 700 into pools of unsearched cells. For example, as the agents continue a pool 720 forms that is bounded by searched cells 725 in row 5 and column E. Another pool 730 is bounded by searched cells in columns E and H. A final pool 740 is bounded by searched cells 735 in row 5 and column H and the edge of the map 700. The agents will each end up within a pool, which they will search, depending on the direction in which they turn when they reach the top of the map 700. In some embodiments, agents are randomly initialized with a spin tendency either to the left or right that will guide their moves in such situations.

FIGS. 8A-8B illustrates a distance-based gradient of the digital pheromone map in one embodiment. FIG. 8A illustrates a digital pheromone map 800 that contains cells marked with an "S" to indicate that they have been searched by a search agent, such as agent A or agent B. Unmarked cells are those that have not been searched. FIG. 8B illustrates a distance field 850 for the digital pheromone map 800 of FIG. 8A. The distance field 850 contains the distance from each cell to the nearest unsearched cell. For example, cell J1 contains a value of one because the nearest unsearched cells are cell I2 and cell J2, which are each one cell away. Unsearched cells have a value of zero. The gradient of the values shows a progression from high distances to low distances that leads to unsearched cells. For example, cell A6, which contains a value of 3, can be thought of as the peak of a mountain that slopes downward to cells A5, B5, and B6, and eventually to the nearby unsearched cells in row 3 and column D. Agents can descend the gradient from any point to find unsearched cells. The distance gradient is not subject to the problem of local minima because as cells are searched, the gradient always leads to an absolute minimum in the location of the final unsearched cells.

From the foregoing, it will be appreciated that specific embodiments of the search system have been described herein for purposes of illustration, but that various modifications may be made without deviating from the spirit and scope of the invention. For example, although search agents have been described in the context of UAVs, the techniques described may also be used in other contexts such as space exploration or undersea searches. Similar techniques may also be used to assist a human pilots in manned vehicles. Likewise, although searching has been described, similar techniques may be useful for tasks other than searching, such as crop dusting where a substance is distributed over a geographic area. Searches may also be performed on an ongoing basis, such as to track weather patterns where conditions of the environment change over time. Accordingly, the invention is not limited except as by the appended claims.

I claim:

1. A system for distributing agents performing an operation related to a geographic area, comprising:
   a digital map component for maintaining a digital map of the geographic region wherein the digital map is divided into cells that contain information about the progress of an operation related to the geographic area;
   an agent tracking component for determining the location of an agent relative to other agents based on the digital map;
   a data exchange component for determining the communication range of the agent to the other agents; and
   a move determining component for selecting a heading based on the location and communication range of the agent to the other agents.

2. The system of claim 1 wherein:
   the digital map component maintains a digital map stored by an unmanned aerial vehicle acting as an agent to perform an exhaustive search of the geographic area;
   the agent tracking component determines the location of the unmanned aerial vehicle relative to other unmanned aerial vehicles;
   the data exchange component determines the communication range of the unmanned aerial vehicle to other unmanned aerial vehicles; and
   the move determining component selects a heading that maximizes the communication range of the network formed by the agents and reduces agent crowding.

3. The system of claim 1 wherein the move determining component selects the heading based on a distance gradient of the digital map that indicates the distance from each cell of the digital map to the nearest cell for which the operation has not been completed.

4. The system of claim 1 wherein the data exchange component synchronizes the digital map with instances of the digital map maintained by at least one other agent based on an update key containing a summary of the state of the digital map of the at least one other agent.

5. A computer-readable medium containing instructions for controlling a computer system to distribute agents performing an operation related to a geographic area, by a method comprising:
   maintaining a digital map of the geographic region wherein the digital map is divided into cells that contain information about the progress of an operation related to the geographic region;
   determining the location of an agent relative to other agents based on the digital map;
   determining the communication range of the agent to the other agents; and
   selecting a heading based at least in part on at least one of the location and communication range of the agent.

6. The computer-readable medium of claim 5 wherein determining the communication range further comprises determining the range of a peer-to-peer wireless network between the agents.

7. The computer-readable medium of claim 5 further comprising communicating with at least one other agent to synchronize the digital map with an instance of the digital map maintained by the at least one other agent.

8. The computer-readable medium of claim 5 wherein the communication of the agents forms an ad hoc network.

9. The computer-readable medium of claim 8 wherein the locations of the agents form an ad hoc network having an approximate minimal spanning tree topology.

10. The computer-readable medium of claim 5 wherein the selected heading forms a search pattern that maximizes the distance from the agent to other agents while staying within communication range with at least one other agent.

* * * * *